(12) United States Patent
Jung et al.

(10) Patent No.: US 7,179,441 B2
(45) Date of Patent: Feb. 20, 2007

(54) METHOD FOR PREPARING BARIUM-TITANATE BASED POWDER

(75) Inventors: Jae Chul Jung, Daejeon (KR); Woo Young Yang, Daejeon (KR); Keon Il Kim, Daejeon (KR); Yun Jung Park, Daejeon (KR); Jun Hee Lee, Daejeon (KR); Kang Heon Hur, Kyunggi-do (KR); Seon Cheol Park, Kyunggi-do (KR); Jai Joon Lee, Kyunggi-do (KR)

(73) Assignees: Samsung Fine Chemicals Co., Ltd. (KR); Samsung Electro-Mechanics Co., Ltd. (KR)

( * ) Notice: Subject to any disclaimer, the term of this patent is extended or adjusted under 35 U.S.C. 154(b) by 240 days.

(21) Appl. No.: 10/486,695

(22) PCT Filed: May 6, 2002

(86) PCT No.: PCT/KR02/00836

§ 371 (c)(1),
(2), (4) Date: Aug. 16, 2004

(87) PCT Pub. No.: WO03/016219
PCT Pub. Date: Feb. 27, 2003

(65) Prior Publication Data
US 2004/0253172 A1   Dec. 16, 2004

(30) Foreign Application Priority Data
Aug. 14, 2001  (KR) ............................. 2001-49048

(51) Int. Cl.
*C01F 11/00* (2006.01)
*C01G 23/00* (2006.01)

(52) U.S. Cl. .............. 423/593.1; 423/598; 423/594.16; 423/594.9; 423/594.12; 423/71; 423/85; 423/155; 423/158; 423/89; 423/69; 501/137; 501/138; 501/139

(58) Field of Classification Search ............. 423/593.1, 423/598, 594.16, 594.9, 594.12, 71, 85, 155, 423/158, 89, 69; 501/137, 138, 139
See application file for complete search history.

(56) References Cited

U.S. PATENT DOCUMENTS

| 5,219,811 | A | * | 6/1993 | Enomoto et al. ............ 501/138 |
| 5,468,427 | A | * | 11/1995 | Stangle et al. ............... 264/3.4 |
| 5,523,065 | A | * | 6/1996 | Stangle et al. ................ 423/71 |
| 5,818,686 | A | * | 10/1998 | Mizuno et al. ............. 361/311 |

(Continued)

FOREIGN PATENT DOCUMENTS

JP   189830   7/2000

(Continued)

*Primary Examiner*—Timothy C. Vanoy
(74) *Attorney, Agent, or Firm*—Merchant & Gould

(57) ABSTRACT

The present invention relates to a method for preparing barium titanate based powder. More particularly, the present invention provides a method for preparing barium titanate powder comprising the following steps of precipitation of barium titanyl oxalate ($BaTiO(C_2O_4)_2 \cdot 4H_2O$) with spraying a mixture of an aqueous barium chloride ($BaCl_2 \cdot 2H_2O$) and titanium tetrachloride ($TiCl_4$) to an aqueous solution of oxalic acid, via a nozzle; wet pulverization by using a beads mill after adding an additive such as an amine; dry; pyrolysis; and re-pulverization.

19 Claims, 1 Drawing Sheet

U.S. PATENT DOCUMENTS

| | | |
|---|---|---|
| 6,409,983 B1 * | 6/2002 | Choi et al. .................. 423/598 |
| 6,548,437 B2 * | 4/2003 | Sato et al. .................. 501/139 |
| 6,641,794 B2 * | 11/2003 | Lee et al. .................. 423/598 |
| 6,692,721 B2 * | 2/2004 | Hur et al. .................. 423/598 |
| 2002/0048547 A1 * | 4/2002 | Lee et al. .................. 423/598 |
| 2004/0115122 A1 * | 6/2004 | Jung et al. .................. 423/598 |

FOREIGN PATENT DOCUMENTS

KR  010008807  4/2004

* cited by examiner

METHOD FOR PREPARING BARIUM-TITANATE BASED POWDER

FIELD OF INVENTION

The present invention relates to a method for preparing barium titanate based powder. More particularly, the present invention provides a method for preparing barium titanate powder comprising the following steps of: precipitating barium titanyl oxalate ($BaTiO(C_2O_4)_2 \cdot 4H_2O$) by spraying an aqueous mixture of barium chloride ($BaCl_2 \cdot 2H_2O$) and titanium tetrachloride ($TiCl_4$) to an aqueous solution of oxalic acid, via a nozzle; wet pulverization by using a beads mill after adding an additive such as an amine; drying; pyrolysis; and re-pulverization.

BACKGROUND OF THE INVENTION

The barium titanate powder has been widely utilized to produce multi-layer ceramic chip capacitors (MLCC), positive temperature coefficient thermistors, resistors, and the like. It is well-known that barium titanate powder can be manufactured via solid state reaction of barium carbonate ($BaCO_3$) and titanium dioxide ($TiO_2$) at high temperature. As the trend in MLCC (multi-layer ceramic chip capacitor) continues towards further and further miniaturization with large capacity, calcination at a low temperature, high frequency, and volumetric efficiency, the demand for not only finer and more uniform barium titanate powders has increased tremendously, but the need for purity and distribution has also escalated as well. Thus, various liquid state reaction methods such as hydrothermal method, co-precipitation (oxalate) method, and alkoxide method have been developed to produce barium titanate powders satisfying these characteristics.

The oxalate method is well discussed by W. S. Clabaugh et al. in *Journal of Research of the National Bureau of Standards*, Vol. 56(5), 289–291(1956) to produce barium titanate by precipitating barium titanyl oxalate with addition of a mixture solution containing Ba and Ti ions to an oxalic acid. However, this method has several drawbacks: (i) it is difficult to control particle size and stoichiometric mole ratio of Ba to Ti; (ii) hard aggregates between particles are formed during the pyrolysis, thus requiring strong pulverization to remove these hard aggregates; (iii) because extremely fine particles are enormously produced during the strong pulverizing, it is hard to disperse the powder for forming and abnormal grain growth occur during sintering process. Thus, the barium titanate powders produced in this manner are not adequate for the applications to multilayer ceramic capacitors.

Therefore, a hydrothermal method has been recently given attention to because of the trend of thinner and higher layered dielectric layer in MLCC. However, This method has disadvantages, like high manufacturing cost and complex process, due to use of autoclave, in spite of its high product quality. Therefore, there are increasing demands for developing simpler methods for preparing barium titanate powders in low price to be competitive in the market.

Inventors of the present invention have filed patent applications in South Korea (Korea Patent Application Nos. 2000-46125 and 2001-9066) for the preparation of barium titanate powder which exhibit improved yield with shortened reaction time and optimized stoichiometry of barium to titanium. The method for preparing barium titanate powder disclosed in the above Korea Patent applications comprises the steps of: precipitating barium titanyl oxalate ($BaTiO(C_2O_4)_2 \cdot 4H_2O$) by spraying an aqueous mixture of barium chloride ($BaCl_2 \cdot 2H_2O$) and titanium tetrachloride ($TiCl_4$) to an aqueous solution of oxalic acid, via a nozzle in high speed and aging, filtering and washing the same; pulverizing the obtained barium titanyl oxalate, drying, and pyrolizing to produce barium titanate ($BaTiO_3$) powder; and re-pulverizing the pre-pulverized barium titanate powder. In the pulverizing process, it can be performed by methods such as dry pulverization using an atomizer and jet mill or wet pulverization using a ball mill, planetary mill, and beads mill. In case it is needed to blend barium titanate ($BaTiO_3$) with other metal additives in the pulverizing step, wet pulverization is more preferable. Among wet pulverizing instruments, planetary mill or ball mill is suitable for laboratory scale, while a beads mill is for industrial scale.

However, when the beads mill is employed for the wet pulverization of barium titanyl oxalate it causes the following problems:

(1) Impurities present in the solution occlude inside barium titanyl oxalate particles during the precipitating step. Thus, impurities, such as oxalic acid or chloride ion remain in barium titanyl oxalate prepared by co-precipitation (oxalate) method, no matter how many it is washed. Since this barium titanyl oxalate mixed with water has pH around 3, it may cause corrosion of pre-mixer whose material is stainless steel. Further, it is difficult to control exothermic heat in case of using acid-resistant material such as polyurethane. Therefore, it requires a use of expensive material like titanium as a pre-mixer. After the wet pulverization, the pH of the barium titanyl oxalate slurry becomes 2 which is lower than that before the wet pulverization. Thus, it may decrease material's durability of beads mill (inside part of mill chamber) like zirconia and polyurethane. Furthermore it causes corrosion of a dryer.

(2) The presence of chloride ions in the barium titanyl oxalate will result in the formation of a $BaCl_2$ liquid phase during sintering, which is disclosed in *Journal of Inorganic chemistry*, vol. 9(11) 2381~89(1970). Thus, the calcined barium titanate aggregates more and exhibits poor dielectric characteristics.

SUMMARY OF THE INVENTION

Accordingly, an object of the present invention is to provide a process for producing barium titanate powder economically by solving problems associated with the wet pulverization of barium titanyl oxalate in the process for preparing barium titanate disclosed in Korea Patent Nos. 2000-46125 and 2001-9066.

BRIEF DESCRIPTION OF DRAWING

The above object of the present invention will become apparent from the following description of the invention, when taken in conjunction with the accompanying drawing, in which.

DETAILED DESCRIPTION OF THE INVENTION

Figure 1:
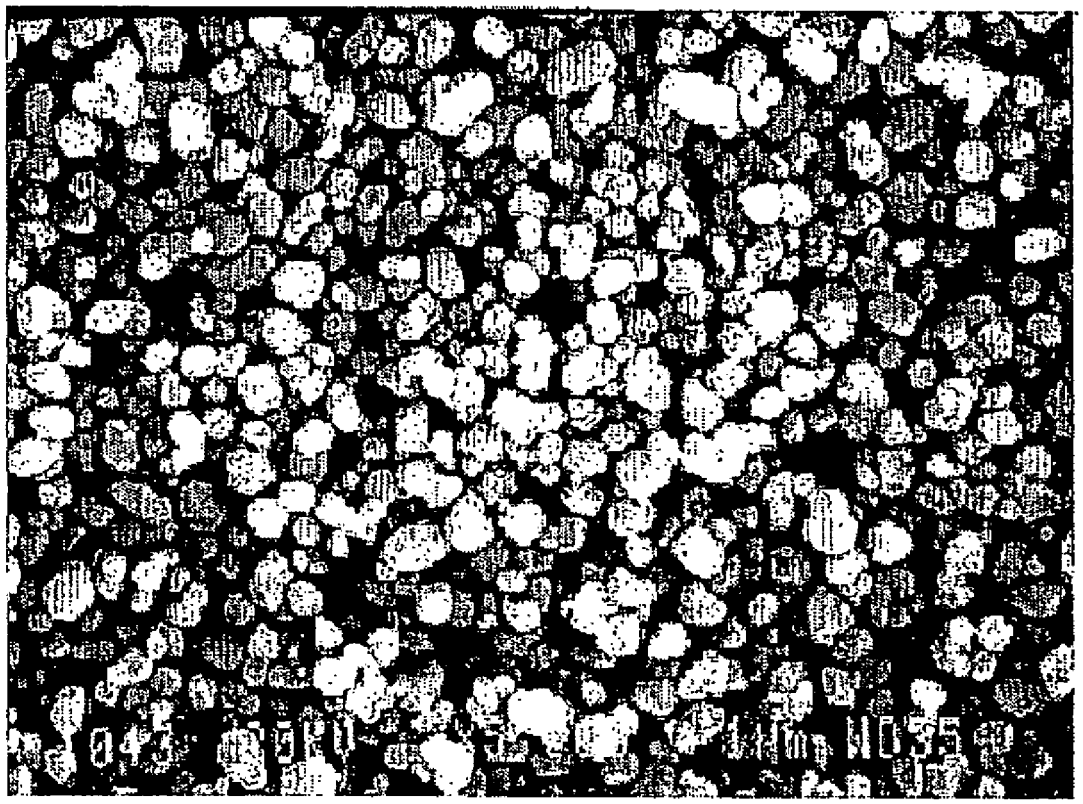
FIG. 1 represents SEM image of barium titanate powder produced by the method of the present invention.

The present invention provides a method for preparing barium titanate powder comprising the steps of:

precipitating barium titanyl oxalate ($BaTiO(C_2O_4)_2 \cdot 4H_2O$) by spraying an aqueous mixture of barium chloride ($BaCl_2 \cdot 2H_2O$) and titanium tetrachloride ($TiCl_4$) to an aqueous solution of oxalic acid, via a nozzle;

wet pulverization by using a beads mill after adding an additive chosen from ammonia, amine, ammonium compound and amino acid;

pyrolizing to produce barium titanate powder; and re-pulverization the obtained barium titanate powder.

The present invention will become apparent from the following description of the invention, when the process for preparing barium titanate powder is described in more detail.

The first step is precipitation of barium titanyl oxalate with spraying an aqueous mixture of barium chloride and titanium tetrachloride to an aqueous solution of oxalic acid via a nozzle in high speed, aging, filtration, and washing with water. The aqueous barium chloride solution is prepared by dissolving barium chloride dihydrate ($BaCl_2.2H_2O$) in water, and preferable barium chloride concentration is in the range of from 0.2 to 2.0 mol/l. The aqueous titanium tetrachloride solution is prepared by diluting titanium tetrachloride solution, and preferable titanium tetrachloride concentration is in the range of from 0.2 to 2.0 mol/l. The mole ratio of the barium compound/titanium compound is controlled being in the range of from 1 to 1.5, more preferably 1 to 1.1 when the aqueous solutions of barium chloride and titanium tetrachloride are added each other. A concentration of the aqueous oxalic acid solution is preferably in the range of from 0.2 to 5.0 mol/l and a temperature is maintained in the range of 20 to 100° C., more preferably 50 to 90° C.

The prepared mixture of barium chloride and titanium tetrachloride is added by spraying into an aqueous oxalic acid solution for 1 to 3 hours through a nozzle. The nozzle used in the present invention may be a single-fluid nozzle or double-fluid, preferably single-fluid nozzle as a matter of convenience.

The aging is performed for 0.5 to 2 hours and then the crude barium titanyl oxalate is washed with water till pH of the washer turns to neutral to produce the corresponding barium titanyl oxalate.

The second step is wet pulverization of the obtained barium titanyl oxalate by means of a beads mill and drying. A solvent used for the wet pulverization is deionized water of which amount used is 1 to 10 parts by weight, relative to 1 part by weight of barium titanyl oxalate. During the process of the wet pulverization, a nitrogen-containing additive is added to prevent from acidification of the mixture after pulverization and decrease of dielectric characteristics of the powder due to the presence of chloride ions within the barium titanyl oxalate.

Examples of the nitrogen-containing additive include ammonia, amines, ammonium compounds and amino acids. Particularly, use of an inorganic base such as sodium hydroxide, potassium carbonate and sodium bicarbonate is not preferable to remove chloride ions due to decrease of dielectric characteristics of the powder such as dielectric constant and insulation resistance. However, the nitrogen-containing additive used in the present invention is preferable due to no containing of metal cations.

The amine used in the present invention is expressed by the following formula (1),

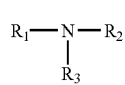
(1)

wherein $R_1$, $R_2$, and $R_3$ represent individually hydrogen atom or $C_1$–$C_5$ alkyl.

Examples of primary, secondary or tertiary amine include methylamine, dimethylamine, trimethylamine, diethylamine and triethylamine.

The ammonium compound used in the present invention is expressed by the following formula (2),

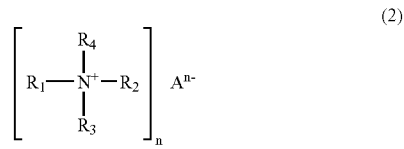
(2)

wherein $R_1$, $R_2$, and $R_3$ represent individually hydrogen atom or $C_1$–$C_5$ alkyl; A represents hydroxyl (n=1), nitrate (n=1), sulfate (n=2), phosphate (n=3), carbonate (n=2), bicarbonate (n=1), $C_1$–$C_{10}$ carboxyl (n=1), or $C_2$–$C_{10}$ dicarboxyl group (n=2).

Preferred examples of the ammonium compound include ammonium hydroxide, ammonium carbonate, ammonium acetate, ammonium phosphate, ammonium oxalate, ammonium bicarbonate, and trimethylammonium hydroxide. Examples of the amino acid include arginine and lysine.

The nitrogen-containing additive is used in the range of from 0.5 to 20 mol %. If it is less than 0.5 mol %, it is undesirable in acidity and chloride content of the slurry. On the other hand, if it exceeds 20 mol %, it results in non-stoichiometric mole ratio of Ba to Ti due to loss of titanium component.

Further, a divalent or tetravalent metal may be arbitrarily incorporated with the nitrogen-containing additive and replaced for Ba or Ti position. A divalent metal may be replaced for Ba and a tetravalent metal may be for Ti. Examples of the divalent metal include Mg, Ca, Sr, and Pb and those of the tetravalent element include Zr, Hf, and Sn. These metals may be used in the form of oxides, carbonates, chlorides or nitrates. For example, an oxide, carbonate, chloride or nitrate of such a replacement element is added to the barium titanyl oxalate to produce perovskite-type barium titanate based powder such as $Ba(Ti_{1-z}Zr_z)O_3$, $(Ba_{1-x}Ca_x)(Ti_{1-z}Zr_z)O_3$, $(Ba_{1-x-y}Ca_xSr_y)(Ti_{1-z}Zr_z)O_3$, and the like.

The wet pulverized barium titanyl oxalate is dried and pyrolyzed to form barium titanate in the presence of the additive. A rate for heating during the pyrolysis is preferably in the range of 0.5 to 10° C./min and a temperature is maintained at 700 to 1200° C.

The last step is re-pulverization of the obtained barium titanate powder. The barium titanate powder can be easily pulverized by means of dry pulverization using an atomizer, or jet mill or wet pulverization using a ball mill, planetary mill, or beads mill. Drying is performed using oven, dryer, or spray dryer only when the wet pulverization is carried.

The following examples are intended to further illustrate the present invention without limiting its scope. Further, the scope of the present invention is not limited to barium titanate powder but includes potential barium titanate-based powders depending on kinds and contents of additives added.

EXAMPLE 1

1200 l of an aqueous 1 mol/l $TiCl_4$ and 1320 l of an aqueous 1 mol/l $BaCl_2$ were added to a glass-lined 4 $M^3$ reactor and mixed. The mixture was sprayed to 2520 l of an aqueous 1 mol/l oxalic acid in 6 $M^3$ reactor through a single-fluid nozzle such as full-con at a rate of 21 l/min. The oxalic acid solution was stirred with a rate of 150 rpm and a temperature was maintained at 90° C. A diaphragm pump was used as a supplying pump for spraying the mixture solution. After spraying the mixture to an oxalic acid for 2 hours, the mixture solution was stirred at a reaction temperature for 1 hour and at room temperature for 1 hour to produce barium titanyl oxalate slurry. The barium titanyl oxalate slurry was filtered using a centrifuge and washed with water till pH of the filtrate turned to above pH 6. Yield was 98% based on Ti ion and a mole ratio of Ba to Ti was 0.999 (water content of 24%). 0.5 kg of 29 wt. % aqueous ammonia (10.1 mol %, relative to the barium titanyl oxalate) was added to 50 kg of the barium titanyl oxalate in 250 kg of deionized water. The slurry was stirred and the pH thereof before the pulverization was 9.3. Then, the slurry was performed for the wet pulverization to be 15 μm of maximum particle size with a beads mill. The pH of the slurry after the pulverization was 5.1. After the obtained barium titanyl oxalate slurry was dried in an oven at 120° C. for 12 hours, the chloride ion content was 200 ppm. The barium titanyl oxalate slurry was then pyrolized at 1200° C. in an electric furnace and performed for dry-pulverization to produce barium titanate powder. SEM image of barium titanate powder was represented in FIG. 1.

EXAMPLES 2–6

Barium titanate powder was prepared by the same procedure as in Example 1, except varying amount of aqueous ammonia during the wet pulverization. The characteristics of the obtained slurry were summarized in Table 1.

COMPARATIVE EXAMPLE 1

Barium titanyl oxalate was prepared by the same procedure as in Example 1 and the mole ratio of Ba/Ti was 0.999 (water content of 24%).

50 kg of the barium titanyl oxalate and 250 kg of deionized water were placed and stirred in the reactor. The pH of the slurry before the pulverization was 3.0. Then, the slurry was performed for the wet pulverization to be 15 μm of maximum particle size with a beads mill. The pH of the slurry after the pulverization was 2.0. After the obtained barium titanyl oxalate slurry was dried in an oven at 120° C. for 12 hours, the chloride ion content was 10000 ppm. Then, barium titanate powder was prepared by the same procedure as in Example 1.

TABLE 1

| Category | Used amount of aqueous ammonia (mol %) | Before pulverization pH | Ba/Ti ratio* | After pulverization pH | Content of Cl- | Ba/Ti ratio* |
|---|---|---|---|---|---|---|
| Exam. 1 | 10.1 | 9.3 | 0.999 | 5.1 | 200 | 0.999 |
| Exam. 2 | 0.4 | 8.3 | 0.999 | 3.0 | 500 | 0.999 |
| Exam. 3 | 0.5 | 9.0 | 0.999 | 5.0 | 200 | 0.999 |
| Exam. 4 | 20 | 10.0 | 0.999 | 5.2 | 200 | 0.999 |
| Exam. 5 | 21 | 10.2 | 0.999 | 5.4 | 200 | 1.001 |
| Exam. 6 | 25 | 10.2 | 0.999 | 5.4 | 200 | 1.005 |
| Com. Exam. 1 | — | 3.0 | 0.999 | 2.0 | 10000 | 0.999 |

Ba/Ti ratio*: XRF measurement

EXAMPLES 7–12

Barium titanate powder was prepared by the same procedure as in Example 1, except using different additive with different amount during the wet pulverization. The characteristics of the obtained slurry were summarized in Table 2.

TABLE 2

| Category | Additive | Amount (mol %) | Before pulverization pH | Ba/Ti ratio* | After pulverization pH | Content of Cl- | Ba/Ti ratio* |
|---|---|---|---|---|---|---|---|
| Ex. 7 | Ammonium acetate | 10 | 6.8 | 0.999 | 5.1 | 200 | 0.999 |
| Ex. 8 | Ammonium nitrate | 8 | 5.5 | 0.999 | 4.9 | 200 | 0.999 |
| Ex. 9 | triethylamine | 15 | 10.2 | 0.999 | 5.0 | 200 | 0.999 |
| Ex. 10 | Ammonium carbonate | 14 | 7.9 | 0.999 | 4.8 | 200 | 0.999 |
| Ex. 11 | Ammonium phosphate | 13 | 8.1 | 0.999 | 5.0 | 200 | 0.999 |
| Ex. 12 | arginine | 12 | 8.0 | 0.999 | 4.8 | 200 | 0.999 |

Ba/Ti ratio*: XRF measurement

EXAMPLE 13

Barium titanyl oxalate was prepared by the same procedure as in Example 1, except addition of aqueous ammonia and additionally $CaCO_3$ and $ZrO_2$ during the pulverization process. Then it was performed for dry, pyrolysis at 1190° C., and pulverization to produce $(Ba_{0.952}Ca_{0.05})(Ti_{0.84}Zr_{0.16})O_3$.

The obtained perovskite barium titanate powder has 0.52 μm of average particle size and 4.02 m$^2$/g of specific surface.

COMPARATIVE EXAMPLE 2

$(Ba_{0.952}Ca_{0.05})(Ti_{0.84}Zr_{0.16})O_3$ was prepared by the same procedure as in Example 13, except that aqueous ammonia was not added during the pulverization process.

The obtained perovskite barium titanate powder has 0.54 μm of average particle size and 4.01 m$^2$/g of specific surface.

EXPERIMENTAL EXAMPLE

Determination of Conductivity Characteristics

A PVA binder and some additives for Y5V were added to each barium titanate powder prepared in Example 13 and Comparative Example 2. Each mixture was well mixed in an alumina mortar and dried. Then, each mixture was crushed in the mortar and sieved in order to obtain granules. 0.4 g of each granule was pressed into a Φ 10 mm disc in a mold. Then some dielectric characteristics were tested and the results are shown in Table 3.

TABLE 3

| Category | Green density (g/cm$^3$) | Sintering density (g/cm$^3$) | Dielectric Constant | Dielectric loss (%) | Insulating resistance ($10^{11}$ Ω) | TCC* (%) |
|---|---|---|---|---|---|---|
| Ex. 13 | 3.69 | 5.90 | 12100 | 3.72 | 0.44 | −60.3/10.2 |
| Com. Ex. 2 | 3.68 | 5.89 | 10000 | 4.57 | 0.01 | −67.2/13.8 |

*TCC: Temperature coefficient of capacitance

As shown in Table 3, the barium titanate powder (Example 13) prepared by using an additive during the wet pulverization process according to the present invention has superior conductivity characteristics (e.g., higher dielectricity, higher insulating resistance, lower dielectric loss) compared to the barium titante powder (Comparative Example 2) prepared by the conventional method.

As described above, in the preparing process of barium titanate powder of high quality employing oxalate-derived method, the present invention provides an improved manufacturing process of the barium titanate powder by employing a nitrogen-containing additive such as amines to barium titanyl oxalate during the wet pulverization which prevents from the acidification of the slurry and decreasing the dielectric characteristics of the powder before and after the pulverization due to the presence of chloride ions. It is, therefore, suitable for as materials for multilayer ceramic capacitors, PTC thermistors, resistors, and the like.

What is claimed is:

1. A method for preparing barium titanate powder comprising the steps of:
    precipitating barium titanyl oxalate from a mixture of aqueous barium chloride and titanium tetrachloride in an aqueous oxalic acid by spraying via a nozzle in high speed, aging, filtering and washing to obtain barium titanyl oxalate;
    wet pulverizing the obtained barium titanyl oxalate after adding a nitrogen-containing additive selected from the group consisting of ammonia, amines, ammonium compound, and amino acids by means of a beads mill, drying and pyrolyzing to produce barium titanate powder; and
    re-pulverizing the obtained barium titanate powder.

2. A method for preparing barium titanate powder of claim 1, wherein said nitrogen-containing additive is used in the range of 0.5 to 20 mol % relative to barium titanyl oxalate.

3. A method for preparing barium titanate powder of claim 1, wherein said amine is expressed by the following formula (1),

wherein $R_1$, $R_2$, and $R_3$ represent individually hydrogen atom or $C_1$–$C_5$ alkyl.

4. A method for preparing barium titanate powder of claim 3, wherein said amine is selected from the group consisting of methyl amine, dimethylamine, trimethylamine, diethylamine, and triethylamine.

5. A method for preparing barium titanate powder of claim 1, wherein said ammonium compound is expressed by the following formula (2),

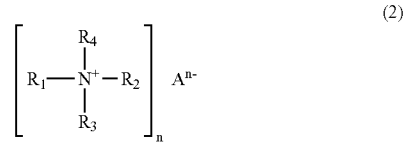

wherein $R_1$, $R_2$, and $R_3$ represent individually hydrogen atom or $C_1$–$C_5$ alkyl; A represents hydroxyl (n=1), nitrate (n=1), sulfate (n=2), phosphate (n=3), carbonate (n=2), bicarbonate (n=1), $C_1$–$C_{10}$ carboxyl (n=1), or $C_2$–$C_{10}$ dicarboxyl group (n=2).

6. A method for preparing barium titanate powder of claim 5, wherein said ammonium compound is selected from the group consisting of ammonium hydroxide, ammonium carbonate, ammonium acetate, ammonium phosphate, ammonium oxalate, ammonium bicarbonate, and trimethylammonium hydroxide.

7. A method for preparing barium titanate powder of claim 1, wherein said amino acid is selected from the group consisting of arginine and lysine.

8. A method for preparing barium titanate powder of claim 1, wherein a divalent or tetravalent metal is used with said nitrogen-containing additive.

9. A method for preparing barium titanate powder of claim 8, wherein a divalent metal is at least on selected from the group consisting of Mg, Ca, Sr, and Pb.

10. A method for preparing barium titanate powder power of claim 9, wherein said additive is selected from the group consisting of oxides, carbonates, chlorides and nitrates of said metal.

11. A method for preparing barium titanate powder of claim 8, wherein said tetravalent metal is at least one selected from the group consisting of Zr, Hf, and Sn.

12. A method for preparing barium titanate powder of claim 11, wherein said additive is selected from the group consisting of oxides, carbonates, chlorides and nitrates of said metal.

13. A method for preparing barium titanate powder of claim 8, wherein said additive is selected from the group consisting of oxides, carbonates, chlorides and nitrates of said metal.

14. A method for preparing barium titanate of claim 1, wherein the aqueous barium chloride has a concentration of 0.2 to 2.0 mol/l.

15. A method for preparing barium titanate of claim 1, wherein the titanium tetrachloride has an aqueous concentration of 0.2 to 2.0 mol/l.

16. A method for preparing barium titanate of claim 1, wherein the aqueous oxalic acid has a concentration of 0.2 to 5.0 mol/l.

17. A method for preparing barium titanate of claim 1, wherein the precipating step is effected at a temperature of from 20 to 100° C.

18. A barium titanate powder produced by the method of claim 1, having a higher insulating resistance and lower dielectric loss as compared to barium titanate powder produced by a wet pulverization process of preparing barium titanate without using said nitrogen-containing additive.

19. A barium titanate powder of claim 18, wherein said dielectric constant is about 20% greater than that produced by said wet pulverization process without using said nitrogen-containing additive and wherein said nitrogen-containing additive is ammonia.

* * * * *